United States Patent [19]
Simmering et al.

[11] Patent Number: 6,036,851
[45] Date of Patent: Mar. 14, 2000

[54] PEAT BALE FILTRATION ELEMENT

[76] Inventors: Stephen G. Simmering, 689 Broadview Avenue, Ottawa, Ontario, Canada, K2A 2L9; Dennis Martin, 14E Knollsbrok Avenue, Nepean, Ontario, Canada

[21] Appl. No.: 09/108,284

[22] Filed: Jul. 1, 1998

Related U.S. Application Data

[63] Continuation-in-part of application No. 08/545,028, Oct. 19, 1995, abandoned.

[51] Int. Cl.$^7$ ..................................................... C02F 3/10
[52] U.S. Cl. ......................... 210/150; 210/617; 210/496; 210/510.1
[58] Field of Search ..................................... 210/615–618, 210/150, 151, 283, 323.1, 484, 496, 503, 510.1

[56] References Cited

U.S. PATENT DOCUMENTS

| | | | |
|---|---|---|---|
| 4,806,148 | 2/1989 | Ottengraf | 210/151 |
| 5,049,205 | 9/1991 | Boyd et al. | 210/150 |
| 5,108,614 | 4/1992 | Ross et al. | 210/283 |
| 5,178,769 | 1/1993 | Simpson et al. | 210/496 |
| 5,206,200 | 4/1993 | Buelna et al. | 502/404 |
| 5,478,464 | 12/1995 | Cyr | 210/617 |
| 5,690,827 | 11/1997 | Simmering et al. | 210/617 |

FOREIGN PATENT DOCUMENTS

| | | |
|---|---|---|
| 1034686 | 7/1978 | Canada . |
| 2116090 | 2/1994 | Canada . |

*Primary Examiner*—Thomas G. Wyse
*Attorney, Agent, or Firm*—Rothwell, Figg, Ernst & Kurz, P.C.

[57] ABSTRACT

A peat bale for use in a peat water filtration system, wherein the peat bale has a permeable wrapping to maintain the bale of peat at a predetermined density and which allows for the inflow and outflow of water through the bale.

24 Claims, 3 Drawing Sheets

PEAT BALE FILTRATION ELEMENT

CROSS-REFERENCE

This application is a continuation-in-part of U.S. application Ser. No. 08/545,028, filed Oct. 19, 1995, abandoned.

FIELD OF INVENTION

This invention relates to a bale of peat for use in a water treatment facility, and in particular a waste and storm water treatment facility, and also a method of treating waste water and storm water using bales of the present invention.

BACKGROUND OF THE INVENTION

Peat filtration of water is known to provide a high level of waste water treatment through physical, chemical and biological processes. Significant reductions in organic carbon, nitrogen, phosphorous, suspended solids, trace metals, and microorganisms can be achieved using peat as a filter. The filter also tends to reduce the pH and increase the dissolved oxygen content of water passing through it. Peat filters for waste water treatment have been in use since the late 1970's.

Presently, when peat is used as component of a treatment system it requires considerable labor and material handling, as well as careful material selection, to construct the peat bed. Peat is obtained at source and is transported either in bulk or in bags to the filtration site. When peat is packed in bags, that are packed to a specific volume (i.e. bag volume), the density of the peat in the bag is variable depending upon the moisture content at the time of packing.

Once at the site, the peat is initially stockpiled until the peat bed of the filtration site is ready to be filled. Loose peat is considerably voluminous and is therefore costly to transport, whereas peat that is bagged involves a considerable amount of labor and cost in handling the bags, namely all of the steps of packing, moving and unpacking.

When a peat filtration site is ready, the peat is added to form a bed in a series of layers. Each of the layers must be raked level to a consistent grade and then compacted to a specific density. One method of compaction is to use people wearing snowshoes to walk over the layers of the peat for long periods of time.

The density is measured by an experienced person who walks over the peat and then measures the depth of penetration of the foot print correlated with mechanically drawn cores of known volume weighed and dried to enable calculation of density. This is a time consuming process and often results are not obtained in a timely fashion to permit rapid installation of successive peat layers. Additionally, meaning the depth of penetration of a foot print is a far from accurate measure. Mechanical coring of the peat is also not entirely accurate due to the properties of the peat. Technicians applying different pressures or handling the equipment differently would have different amounts of peat in the core (i.e. applying different pressures on the sampler will cause the peat to be compressed). The peat bale of the present invention utilizes a known weight of peat packaged to a known volume, thus providing a very accurate density.

Peat is a natural active biological medium and this activity is very important to its suitability as a filter medium. Each successive stage of handling can effect the biological activity and the moisture content and thus variables of installation change on a continuous basis. The monitoring of conditions such as age, moisture content and level of compaction in the peat bed requires highly trained and experienced personnel to closely observe the filling. Even so, the variability of conditions related to handling, installation and peat quality result in difficulty in obtaining optimum performance even with highly trained supervision.

The disadvantages of peat handling and the associated filling of peat filtration beds can be overcome by packing the peat to a predetermined density in a water permeable wrapping such that the bales can be directly used to construct the peat bed. This provides several distinct advantages over present installation method since: 1) the moisture content of peat will be easier to monitor and control; 2) the peat is already compressed in a controlled and reliable manner; 3) there is reduced potential for loss of biological activity during the handling and storage stages; 4) there is reduced potential for contamination of the peat during handling and storage; 5) wastage of peat during handling is eliminated; 6) simplicity of installation is greatly enhanced; and 7) a more uniform level of treatment performance can be achieved.

Prior to the present invention the packaging of peat for use in a waste water treatment system would not have been expected to work. One would have expected, due to the air pockets between the packaged bales, that the water would flow through the cracks between the packaged peat and thus by-pass the treatment media.

U.S. Pat. No. 5,049,265 (Boyd et al.) describes an effluent treatment system that comprises a mixture of young Sphagnum peat and an organic peat fibre in the system. In this system they have included a fibrous material having a relative low absorptive capacity, which reduces ponding or clogging of their system. Thus, according to the teaching of this prior art, effluent treatment system with a high absorptive capacity would not be expected to work, which teaches away from the present treatment system. Also within the Boyd et al. system is an air permeable lid which carries a layer of peat material, which functions to control odor from the system.

The peat bale of the present invention is distinct from and overcomes several disadvantages of the prior art systems, including Boyd et al., as will be discussed in detail below.

SUMMARY OF THE INVENTION

According to the present invention there is provided a bale of peat packed to a predetermined density in a water permeable wrapping for use as a filter element of a peat bed water filtration system.

Accordingly, the invention herein comprises a peat bale for use in a water filtration system, said peat bale having a permeable wrapping to maintain said bale of peat at a predetermined density and allow for the inflow and outflow of water through the bale.

In one embodiment of the present invention there is provided a peat bale, for use in a water filtration system, comprising:

peat having a moisture content of from 25% to 85% and a decomposition factor of from H2 to H6; and a water permeable wrapping to encase and maintain said peat at a density in the range of from 50 kg/m$^3$ to 350 kg/m$^3$ and to allow for the inflow and outflow of water through the bale.

In a further embodiment of the present invention the peat bale further comprises a clay material.

The invention also comprises a peat bed water filtration system comprising a waste water input means, a treated water output means, and a filtration unit comprising one or more of the peat bales having a permeable wrapping to maintain said bale of peat at a predetermined density and allow for the inflow and outflow of water through the bale.

In one embodiment of this aspect of the invention there is provided a water filtration system comprising:

a filtration unit comprising one or more peat bales as described above;

a waste water input means for supplying water to be filtered to the filtration unit; and a filtered water output means for releasing water from the filtration unit;

wherein water to be filtered flows through said one or more peat bales.

The invention still further comprises a method of water filtration comprising the sequential steps of passing waste water through a peat bed filter which comprises one or more of bales of peat wrapped in a permeable coating to a predetermined density and collecting the outflow from the peat filter.

BRIEF DESCRIPTION OF THE DRAWINGS

These and other objects and advantages of the invention will become apparent upon reading the detailed description and upon referring to the drawings in which.

Figure 1:
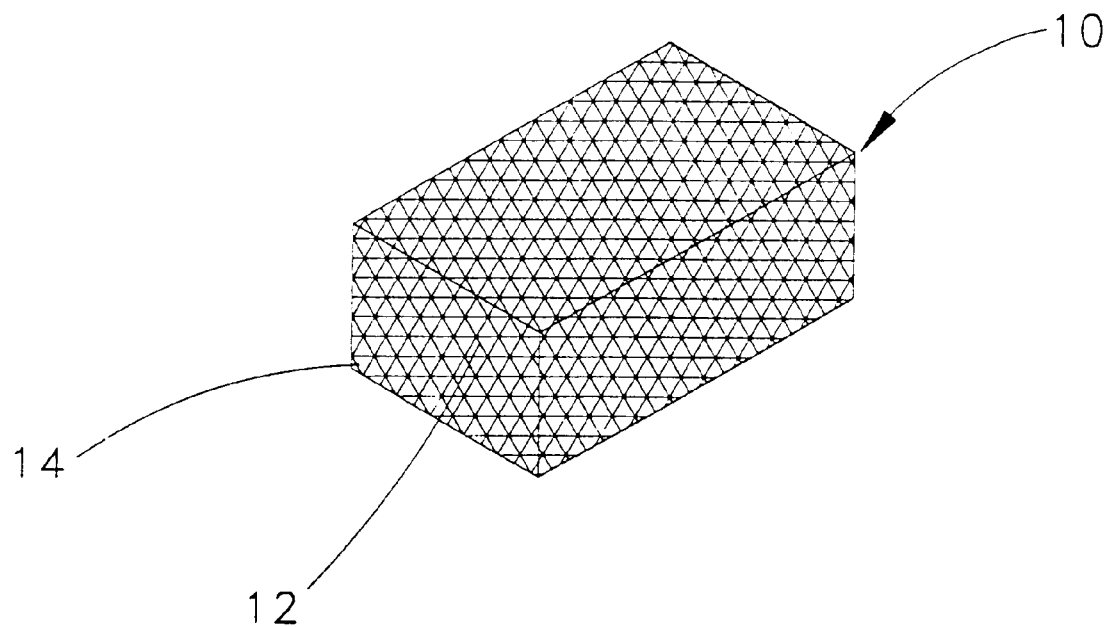
FIG. 1 is a perspective view of the peat bale of the present invention.
Figure 2:
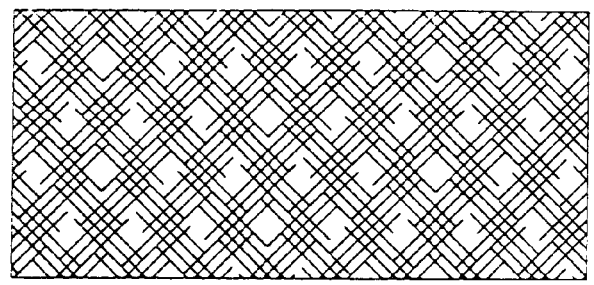
FIG. 2 is an end view of the bale of FIG. 1 with the wrapping partially removed.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

As shown in FIG. 1 the bale 10 has a permeable wrapping means 12 which encases the peat moss filter medium 14. The term "wrapping" is intended, for the purpose of this application, to describe a covering on all sides of the bale which, when tightened, physically permit the bale to be placed under compression. This wrapping is necessary to ensure the maintenance of the level of density of the bale (the importance of density is described below). Any suitable material that will maintain the integrity of the bale at a particular density range while permitting the flow of water into and then out of the peat encased within the bale can be used as a wrapping. Examples of suitable wrapping media include but are not limited to nylon, wire, string mesh, burlap or water permeable geotextiles. For the purpose of shipment to the installation site, the bales can be wrapped, with a non-water permeable wrapping or water resistant wrapping, so as to maintain the moisture content of the bale during shipment. Prior art systems that use peat do not use such a wrapped peat bale, and as such are not able to maintain the peat at a fixed density. Providing the peat at a fixed density in the form of a peat bale, as described in the present invention, results in certain advantages, as will be described in further detail below.

The hydraulic principle of this application is based primarily on capillary attraction (similar to an absorbent sponge) in the fine media. Because of the principle of flow, density (compaction) and the moisture content at the time of compaction are critical parameters. The density and moisture are interrelated parameters (a wet sponge holds its shape (density) better than a dry sponge when compressed), which affect the absorbent characteristics of the peat and make variable field installations more complicated. A coarse fibre filter would operate more like a straw mat where density (compaction is limited due to the coarse mesh structure) and moisture would be less critical. The compaction or density ranges established for this application are based on testing of the media. According to the present invention the filter medium is packed within the permeable wrapping means 12 to a density of between 50 kg/m$^3$ and 350 kg/m$^3$ with a moisture content of from 25% to 85%. A density outside of the stated ranges resulted in hydraulic and treatment problems. At a density of less than 50 kg/m$^3$ the liquid applied to the peat created flow channels in the loosely compacted peat and no longer operated as a sponge like media which allowed fine contact between the liquid and peat media. Negligible treatment resulted when this channeling occurred (as described below). At a density of greater than 350 kg/m$^3$ the peat would form a hardened material that restricted all flow through it. Under this condition no treatment could occur since the liquid would not enter the peat media.

In one embodiment of the present invention the density of the peat is from 75 kg/m$^3$ to 200 kg/m$^3$. In yet a further embodiment of the present invention the density of the peat is from 100 kg/M$^3$ to 150 kg/m$^3$.

In one embodiment of the present invention the moisture content of the bale is between 40% and 60%. In a further embodiment of the present invention the moisture content of the bale is about 50%.

The peat media used in the present invention is limited to a narrow range with specifically defined properties that fall within the global category 'peat' which covers all organic matter usually formed in bogs. Peat is characterized by the parent plant type (sphagnum, sedge, etc.) and by the stage of decomposition measured by the von Post scale from H1 to H10. The decomposition can vary from the living plant and root (H1) to a dark liquid (muck) with no discernible structure (H10). The filter medium is peat, preferably from sphagnum species peat moss with a decomposition factor of between H2 to H6 as measured by the von Post scale.

In one embodiment of the present invention the peat has a decomposition factor of from H3 to H5. In yet another embodiment of the present invention the peat has a decomposition factor of H4. This peat is low in fibre and would be comparable in consistency to a loamy garden topsoil.

The size of the bale can be varied depending upon the size of the system in which the bale will be used and also the type of equipment available for its installation in the peat bed (i.e. whether installation is going to be by hand or by mechanical lift).

Figure 3:
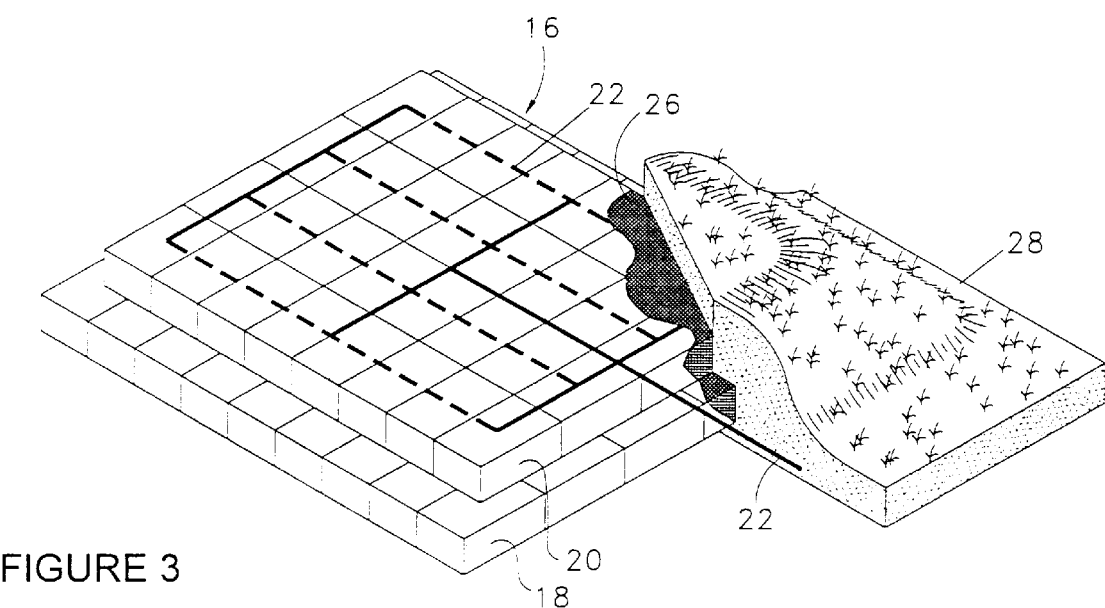
FIG. 3 is a schematic view of a plurality of the bales of a particular embodiment of the present invention when in place as part of a peat bed water treatment system.

Peat beds may be installed in a pit constructed in the ground, or by building a mound on top of the ground. An example of one method of installation of an above ground bed is shown in FIG. 3 where, when in use, in a filtration bed 16, the bales are placed side by side to cover the required area in a first layer 18. A second layer 20 is then placed over the first layer 18 in a staggered pattern such that the first bale of the second layer straddles the two adjacent bales of the layer immediately there below. In this way the direct channels for water to flow between layers are minimized. In any event, due to the hygroscopic nature of peat (high wetting coefficient), water will tend to flow into the peat rather than through any of the small air spaces between bales. There is therefore no need to fill minor gaps between bales. Any number of layers of bales may be used depending upon the filtration capacity required. Once the desired number of layers has been laid in the bed, a perforated pipe 22 is placed directly on top of the bales of the top most layer and connected to an input source 24 for delivery of water to be treated. The distribution system 22 and peat bales are lastly covered with cloth 26 and a suitable backfill material 28. The cloth and backfill are used to stabilize the treatment bed and to protect the bed and, when in use, the biological activity within, from elements such as wind, rain, sun, snow, freezing conditions and human or animal activity.

In use, the water to be treated is delivered to the treatment bed through the input source 24 and distributed over the uppermost layer of the bed by the distribution system 22. The water then percolates down through the various layers of the bed where it undergoes a variety of chemical, biological and physical filtration stages, emerging at the bottom of the bed as treated outflow. It will, of course, be understood that the water to be treated could be delivered as lateral flow through the bed or, indeed, forced upwards under pressure through the bottom of the bed.

Figure 4:
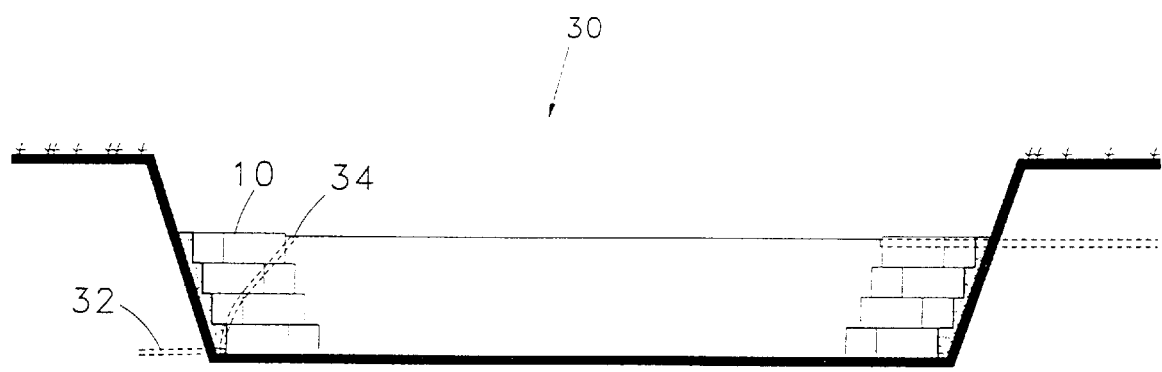
FIG. 4 is a cross-sectional view of the bale of FIG. 1 in place in a storm water pond.

The peat bale 10 may also be used to filter water flowing out of a storm water retention pond 30 as outflow, as seen in FIGS. 4 and 5. The bales 10 can be stacked around the rim of the pond 30 in such a way that as storm water levels in the pond recede, the outflow of water from the pond must first pass through one or more bales 10, prior to entering the storm water outflow pipe 32. In situations where inflow into the pond 30 may exceed its total volume and discharge volume through the peat, an overflow drain, 34 can be provided.

In use the peat in this invention operates as a biologically active, absorbent sponge like media. The overall media surface (or number of peat bales) is sized according to the hydraulic capacity of the media. The hydraulic capacity of the media defined in this invention is defined by the rate of absorbency rate of the media, as noted above, and not a set loading rate.

The fine media reduces the liquid into fine particles in close contact with rich biological activity on the peat media surface. This close contact creates anaerobic microsites which could not be reproduced on coarser media and is necessary for treatment.

Treatment performance in the wastewater treatment field is measured based on the reference parameters, $BOD_5$, total suspended solids (TSS), ammonia, nitrate, and the pathogenic indicator organisms, total and fecal coliform, fecal Streptococcus., and *Escherichia coli*. These parameters were monitored using standard laboratory testing, defined in the "Standard Methods for the Examination of Wastewater", 19th edition, 1995, with the exception of *E. coli*, which was measured using a modified methodology established by the local government agency, Ontario Ministry of the Environment. The testing methodology reference numbers are 5210—$BOD_5$, 2540—suspended solids, 4500—$NO_3$ (nitrate), 4500—$NH_3$ (ammonia), 9222—total coliform, 9222—fecal coliform, 9230—fecal Streptococcus, and MOE MF—FCBCIG—*E. coli*.

A summary of the typical treatment performance from several operating systems is outlined in Table 1. In this system the parameters of the peat were as follows: the density of the peat bale was from 75 kg/m$^3$ to 200 kg/m$^3$, the moisture content was from 40% to 60% and the decomposition factor of the peat was from H3 to H5.

TABLE 1

Typical Treatment Performance Test Results

| Parameter | units | Influent | Effluent |
|---|---|---|---|
| $BOD_5$ | mg/L | 140 | 2 |
| TSS | mg/L | 40 | 4 |
| Ammonia[1] | mg/L | 40 | 1 |
| Nitrate[2] | mg/L | — | 8–10 |
| Total Coliform | per 100 mL | $1 \times 10^7$ | 0 |
| Fecal Coliform | per 100 mL | $1 \times 10^5$ | 0 |
| *E. coli* | per 100 mL | $1 \times 10^4$ | 0 |
| Fecal Streptococcus | per 100 mL | $1 \times 10^5$ | 0 |

[1]Total nitrogen compounds primarily in the form of ammonia in the influent and nitrate in the effluent.
[2]Ammonia Nitrogen is partially converted to Nitrate/Nitrite The above treatment performance has not been achieved by any other prior art method of peat filtration. The pathogenic or disease causing bacteria are eliminated by the fine filtration, biological activity and natural acidity in the fine peat (H4) medium. The fine peat disperses the flow into fine particles providing extensive contact between the low pH peat fibers and the liquid. These conditions are unsuitable for the survival of the pathogenic indicator bacteria noted above. In comparison with the prior art, particularly Boyd et al. (U.S. Pat. No. 5,049,265), the media used is a coarse fibre mixture consisting of several types of media. The coarser media is used to allow higher flow rates and prevent hydraulic failure by ponding or clogging. The results achieved with this prior art media indicate that disinfection of pathogenic bacteria is only partly complete and the effluent concentrations are still very high.

The high biological activity and fine contact also reduce ammonia to low concentrations. Single pass aerobic filters, typically used in the prior art, convert ammonia to other forms of nitrogen (nitrate) and do not reduce the total amount of nitrogen compounds in the liquid passing through it. Nitrate, at concentrations much lower than found in domestic wastewater, is a hazardous and deadly compound when consumed by children in drinking water (infant methemoglobinemia). Nitrate is one of the contaminants of greatest concern to regulators where ground water supplies may be impacted (for example, in Ontario, Canada, it is the only parameter used to determine acceptability of a ground water discharge from on-site sewage treatment systems). Nitrate is very difficult to treat and is not typically removed in most single pass aerobic filters. The peat in this invention has the unique and important capability to reduce all forms of nitrogen including nitrate nitrogen. The nitrate, after conversion from ammonia, is reduced within the fine peat media of this invention. This is accomplished by the fine water particles created from the fine filter media placing the water into close contact with rich biological activity on the peat media surface. The availability of fine peat as a carbon source and the close contact with the fine media creates anaerobic microsites which could not be reproduced on coarser media. This unique treatment capability has repeatedly achieved nitrate concentrations at below drinking water standards (less than 10 mg/L). Prior art treatment systems that treat for ammonia and not for other nitrogen compounds (nitrate) could result in a more hazardous contamination of groundwater supplies than not treating for ammonia.

In an alternative embodiment, the peat filter medium is mixed with a minimum 5% aggregate consisting of a clay media baked in a kiln (similar to ceramic, clay brick, etc.).

In one example of this embodiment the concentration of the aggregate is in the range of from 5% to 95%. In a further example of this embodiment the aggregate is in the range of from 5% to 55%. In a further example of this embodiment the aggregate is in the range of from 55% to 95%. In a further example of this embodiment the aggregate is in the range of from 60% to 90%. This clay based media becomes porous when heated and has demonstrated a high potential for the removal of phosphorus by adsorption. The high removal of phosphorus is complimentary to the treatment by the peat noted above and is particularly important in stormwater applications. The decomposition factor, density, moisture content of the peat component is the same as noted above.

In a further embodiment of the present invention the bale is formed from 100% aggregate consisting of a clay media baked in a kiln.

Thus, it is apparent that there has been provided in accordance with the invention a peat bale filtration element that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

We claim:

1. A peat bale, for use in a water filtration system, comprising:
    peat having a moisture content of from 25% to 85% and a decomposition factor of from H2 to H6; and
    a water permeable wrapping to encase and maintain said peat at a density in the range of from 50 kg/m³ to 350 kg/m³ and to allow for the inflow and outflow of water through the bale.

2. A peat bale according to claim 1 wherein the peat bale has a density in the range of between 75 kg/m³ to 200 kg/m³.

3. A peat bale according to claim 2 wherein said peat has a decomposition factor of from H3 to H5.

4. A peat bale according to claim 3 wherein said peat has a decomposition factor of about H4.

5. A peat bale according to claim 2 wherein the peat bale has a density in the range of between 100 kg/m³ to 150 kg/m³.

6. A peat bale according to claim 2 wherein said peat has a moisture content of between 40 to 60%.

7. A peat bale according to claim 5 wherein said peat has a moisture content of about 50%.

8. A peat bale according to claim 1 wherein the wrapping is selected from the group consisting of: nylon, wire, string mesh, burlap and a water permeable geotextile material.

9. The peat bale of claim 1, wherein said peat is sphagnum species peat moss.

10. A peat bale of claim 1 further comprising at least 5% of a clay material.

11. A peat bale of claim 10 wherein the clay material ranges from 5% to 95%.

12. A peat bale of claim 11 wherein the clay material ranges from 5% to 55%.

13. A peat bale of claim 11 wherein the clay material ranges from 55% to 95%.

14. A peat bale of claim 13 wherein the clay material ranges from 60% to 90%.

15. A peat bale according to claim 10 wherein the peat bale has a density in the range of between 75 kg/m³ to 200 kg/m³.

16. A peat bale according to claim 10 wherein said peat has a decomposition factor of from H3 to H5.

17. A peat bale according to claim 16 wherein said peat has a decomposition factor of about H4.

18. A peat bale according to claim 15 wherein the peat bale has a density in the range of between 100 kg/m³ to 150 kg/m³.

19. A peat bale according to claim 10 wherein said peat has a moisture content of between 40 to 60%.

20. A peat bale according to claim 19 wherein said peat has a moisture content of about 50%.

21. A peat bale according to claim 10 wherein the wrapping is selected from the group consisting of, nylon, wire, string mesh, burlap and a water permeable geotextile material.

22. The peat bale of claim 10, wherein said peat is sphagnum species peat moss.

23. A water filtration system comprising:
    a filtration unit comprising one or more peat bales according to claim 1;
    a waste water input means for supplying water to be filtered to the filtration unit; and
    a filtered water output means for releasing water from the filtration unit;
    wherein water to be filtered flows through said one or more peat bales.

24. A water filtration system comprising:
    a filtration unit comprising one or more peat bales according to claim 10;
    a waste water input means for supplying water to be filtered to the filtration unit; and
    a filtered water output means for releasing water from the filtration unit;
    wherein water to be filtered flows through said one or more peat bales.

* * * * *

UNITED STATES PATENT AND TRADEMARK OFFICE
CERTIFICATE OF CORRECTION

PATENT NO. : 6,036,851
DATED : March 14, 2000
INVENTOR(S) : Stephen G. Simmering, et. al.

It is certified that error appears in the above-identified patent and that said Letters Patent is hereby corrected as shown below:

Title page, item [76], inventor should read as following:

-- Stephen G. Simmering, 689 Broadview Avenue, Ottawa, Ontario, Canada K2A 2L9; Dennis Martin, 132 Grenadier Way, Nepean, Ontario, Canada K2J 4M1 --

Signed and Sealed this

Twenty-seventh Day of February, 2001

*Attest:*

NICHOLAS P. GODICI

*Attesting Officer*   *Acting Director of the United States Patent and Trademark Office*